United States Patent [19]
Groenenboom

[11] Patent Number: 5,278,564
[45] Date of Patent: Jan. 11, 1994

[54] METHOD AND APPARATUS FOR THE DETERMINATION OF THE HEIGHT OF A TARGET

[75] Inventor: Albert Groenenboom, Hengelo, Netherlands

[73] Assignee: Hollandse Signaalapparaten B.V., Hengelo, Netherlands

[21] Appl. No.: 922,785

[22] Filed: Jul. 31, 1992

[30] Foreign Application Priority Data

Aug. 16, 1991 [NL] Netherlands .................. 9101394

[51] Int. Cl.$^5$ ............................................. G01S 13/44
[52] U.S. Cl. .................................. 342/123; 342/148; 342/152
[58] Field of Search ................ 342/123, 148, 149, 152

[56] References Cited

U.S. PATENT DOCUMENTS

4,163,975  8/1979  Guilhem et al. ................ 342/148 X

FOREIGN PATENT DOCUMENTS

0433675  6/1991  European Pat. Off. .
2312037 12/1976  France .
2408843  6/1979  France .

OTHER PUBLICATIONS

Proceedings of the IEEE, vol. 62, No. 6, pp. 687–704, Jun. 1974, D. K. Barton, "Low–Angle Radar Tracking".

Primary Examiner—T. H. Tubbesing
Attorney, Agent, or Firm—Oblon, Spivak, McClelland, Maier & Neustadt

[57] ABSTRACT

Radar apparatus for determining the height of a low-elevation target, the target being illuminated by a transmitter (7) and an antenna (3) via a TR-switch (6). Electromagnetic radiation reflected directly by the target and indirectly by the target via the earth surface is received by the antenna (3) and processed in a sum receiver (9, 10, 11), connected via the TR-switch (6) to the antenna (3), into complex sum signals, and in a difference receiver (12, 13, 14), into complex difference signals. A signal processor (15), receiving the complex sum signals and the complex difference signals, is provided with an algorithm which determines the height of the target. The algorithm enables the determination of the target height while the antenna remains directed at the target.

6 Claims, 3 Drawing Sheets

METHOD AND APPARATUS FOR THE DETERMINATION OF THE HEIGHT OF A TARGET

BACKGROUND OF THE INVENTION

The invention relates to a method for determining, by means of a radar apparatus, the height of a low-elevation target, the radar apparatus being provided with a transmitting and receiving unit to which are connected a transmitting and receiving antenna and a signal processing unit, whereby:

- the target is illuminated by electromagnetic radiation emitted by the transmitting unit and the transmitting antenna;
- the transmitted signal is reflected directly via the target and indirectly via the target and the earth surface in the direction of the receiving antenna;
- by means of the receiving unit, complex sum signals $\Sigma$ and complex elevation difference signals $\Delta$ are derived from signals received by means of the receiving antenna;
- by means of the signal processing unit, an algorithm is carried out for deriving the height of the target from the complex sum and elevation difference signals.

The invention furthermore relates to an apparatus for determining the height of a low-elevation target, comprising a radar apparatus provided with a transmitting unit to which a transmitting antenna is connected, a receiving antenna to which a receiving unit is connected, whereby the target is illuminated by electromagnetic radiation emitted by the transmitting unit and the transmitting antenna and the transmitted signal is reflected directly by the target and by the target via the earth surface in the direction of the receiving antenna and whereby, by means of the receiving unit, complex sum signals $\Sigma$ and at least complex elevation difference signals $\Delta$, which are representative for the target, can be generated, a signal processor connected to the receiving unit, provided with an algorithm for determining the height of the target $h_t$, and means connected to the signal processor for directing the transmitting antenna and the receiving antenna at an aiming point.

The height of a target can be determined by means of a monopulse radar apparatus. The monopulse principle is described in "Introduction to Radar Systems" by M. I. Skolnik, second edition, pages 160–190. A problem encountered in the determination of the height of a target which is flying at a low altitude above the sea surface and, to a lesser extent, also the earth surface, is described on pages 172–176. This problem is due to the phenomenon that the radar apparatus not only receives echo signals directly from the target, but also target echoes reflected by the sea surface. Without the occurrence of this multipath effect, the height of the target can be easily derived from the values of the target range R and the elevation error voltage $E(\theta)$, delivered by the monopulse radar apparatus. The multipath effect causes the elevation error voltage to assume a complex value which renders an accurate determination of the target height impossible.

The occurrence of said multipath effect can only be avoided by selecting a radar antenna beamwidth which is narrow to such an extent that only echo signals directly from the target are received, thereby excluding unwanted target echoes reflected by the sea surface. This method has the drawback, however, that with such a narrow beam, a relatively long time might be required to acquire the target. The patent U.S. Pat. No. 4,743,907 provides an elegant solution to obviate this drawback. By fully integrating two monopulse radar apparatuses, the first radar apparatus having a relatively large wavelength and a consequent wide beam, the second radar apparatus having a relatively small wavelength and a consequent narrow beam, it is possible to achieve an optimal performance in both the acquisition and tracking phases. Such a system, however, entails considerable cost.

A method for accurately determining target height, notwithstanding the occurrence of multipath, is described in the patent U.S. Pat. No. 4,769,031. According to the method disclosed in this patent, the radar antenna is not directed at the actual target, but at a point in space exactly between the actual target and its image. By subsequently measuring with at least two different radar wavelengths, which bear a predetermined relation, a system of equations can be solved, from which several possible target heights can be derived. Thus, by successively comparing possible target heights derived on the basis of this method, the target height can be determined.

An alternative method for accurately determining the target height is described in patent EP-B 0.087.355. According to this method the antenna orientation is constantly varied. Using measuring values obtained at various antenna orientations, it will again be possible to solve systems of equations, from which the target height can be derived.

Both methods are cumbersome and have the drawback that the monopulse radar apparatus is directed at an aiming point which does not coincide with the target. For a monopulse radar apparatus, this misalignment is an evident suboptimal condition which, however, in light of the state of the art is required in order to obtain a solvable system of equations.

SUMMARY OF THE INVENTION

According to the invention the height of a target can be determined on the basis of a method which is characterized in that the transmitting and receiving antenna are substantially directed at the target.

Furthermore, the method described is relatively simple and is characterized in that the height of the target $h_t$ is determined by solving the following equation:

$$\frac{d}{dt} arg(S) = f(R, h_t, Re(S)).$$

The apparatus according to the invention is characterized in that the target and the aiming point at least substantially coincide.

BRIEF DESCRIPTION OF THE DRAWINGS

The invention will be further explained with reference to the follow figures, of which.

DETAILED DESCRIPTION OF THE INVENTION

For accurately determining the height of a target flying at a low altitude above the sea or earth surface, a monopulse radar apparatus is used. In this situation, sum signals and elevation difference signals delivered by the radar apparatus assume complex values, which are to be further processed by a signal processor connected to the radar apparatus.

Figure 1:
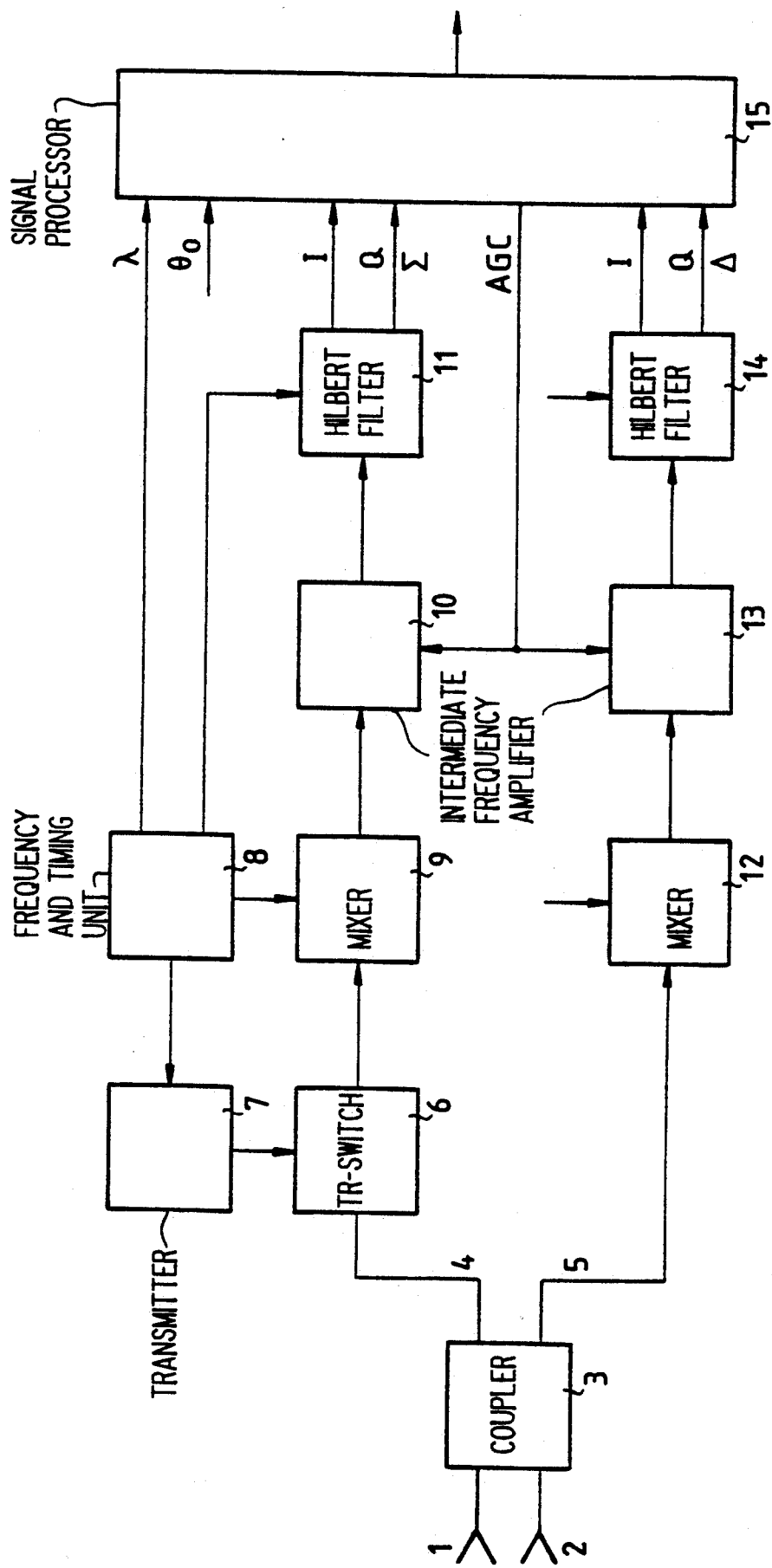
FIG. 1 presents a diagram of a possible embodiment of a monopulse radar apparatus according to the invention.

FIG. 1 presents a diagram of a possible embodiment of a monopulse radar apparatus according to the invention. In order not to unnecessarily complicate the description, only the monopulse behaviour in elevation is included in the analysis. Two antenna elements 1, 2, one placed on top of the other, are connected to a conventional coupler 3, forming a sum channel 4 and a difference channel 5. A transmitter 7, which is controlled from a frequency and timing unit 8 and which transmits pulsed signals, is connected to the sum channel 4 via a TR-switch 6. Signals received via the sum channel are fed via TR-switch 6 to a mixer stage 9, which receives an LO signal from the frequency and timing unit 8. The resulting intermediate-frequency signal is amplified in intermediate-frequency amplifier 10 and converted into a digital, complex sum signal $\Sigma$ by A/D converter and Hilbert filter 11. Signals received via the difference channel 5 are fed to a mixer stage 12, which also receives an LO channel from the frequency and timing unit 8. The resulting intermediate-frequency difference signal is amplified in intermediate-frequency amplifier 13 and converted into a digital, complex difference signal $\Delta$ by A/D converter and Hilbert filter 14. Both signals are fed to a signal processor 15, by means of which an elevation error voltage $S=\Delta/\Sigma$ is determined. The A/D converter and Hilbert filters 11, 14 may be replaced by phase-sensitive quadrature detectors plus A/D converters, but the embodiment described here is more satisfactory with regard to gain and offset stability.

Figure 2:
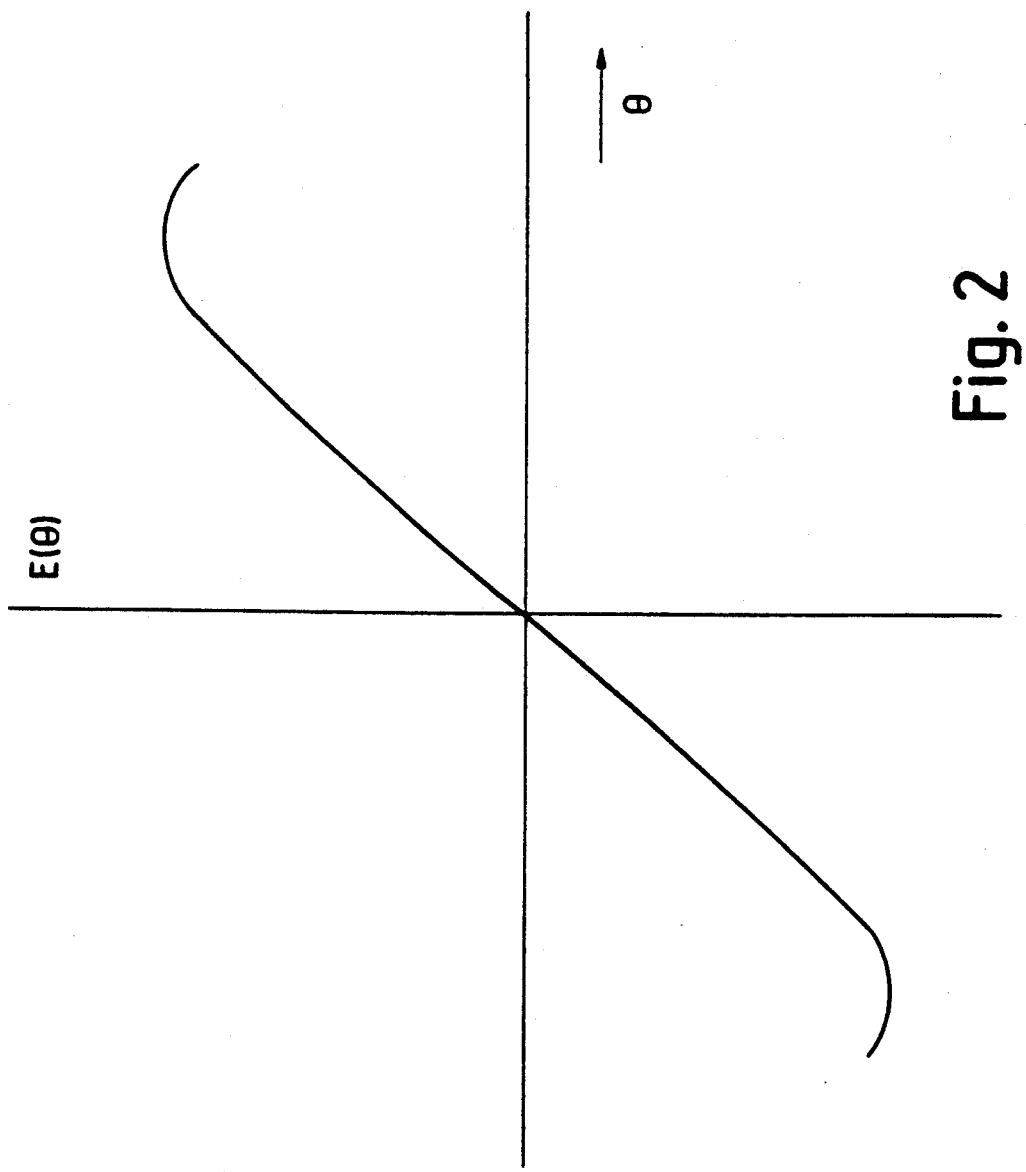
FIG. 2 presents a possible elevation error voltage curve.

Assuming there is a single stationary target in the beam, the vectors $\Sigma$ and $\Delta$ will remain identical for each transmitted pulse and will have a fixed angle in the complex plane. For a single moving target in the beam, both vectors will rotate at the doppler frequency, but will retain the same fixed angle. It is common practice to apply a phase-alignment point in one of both channels, such that both vectors can be aligned. For a single target the elevation error voltage will then be real. The real elevation error voltage curve $E(\theta)$ is represented in FIG. 2. It is noted that the elevation error voltage, notwithstanding its name, is dimensionless. Insofar as this is relevant, is is possible to linearize $E(\theta)$ in signal processor 15, at least for small values of $\theta$; this may be effected by means of a linearizing table. In that case $E(\theta)=K.\theta$ applies for small angles $\theta$. Furthermore, signal processor 15 may generate an AGC control signal for adjusting the gain of both intermediate-frequency amplifiers 10, 13 such that the amplitude of the target echo signal in the sum signal $\Sigma$ is kept substantially constant. This results in less stringent requirements as regards the phase tracking of the sum channel and the difference channel; it allows the use of A/D converters with a limited dynamic range, and limits the size of the linearizing table.

In general, signal processor 15 will perform several other functions which are of minor relevance to the invention described here. Thus, a conventional time-gate function will be implemented in signal processor 15. Also, a form of MTI or MTD doppler processing will be applied to the values delivered by the A/D converters and Hilbert filters 11, 14. In addition, signal processor 15 will generate control signals for directing the transmitting antenna and the receiving antenna.

Figure 3:
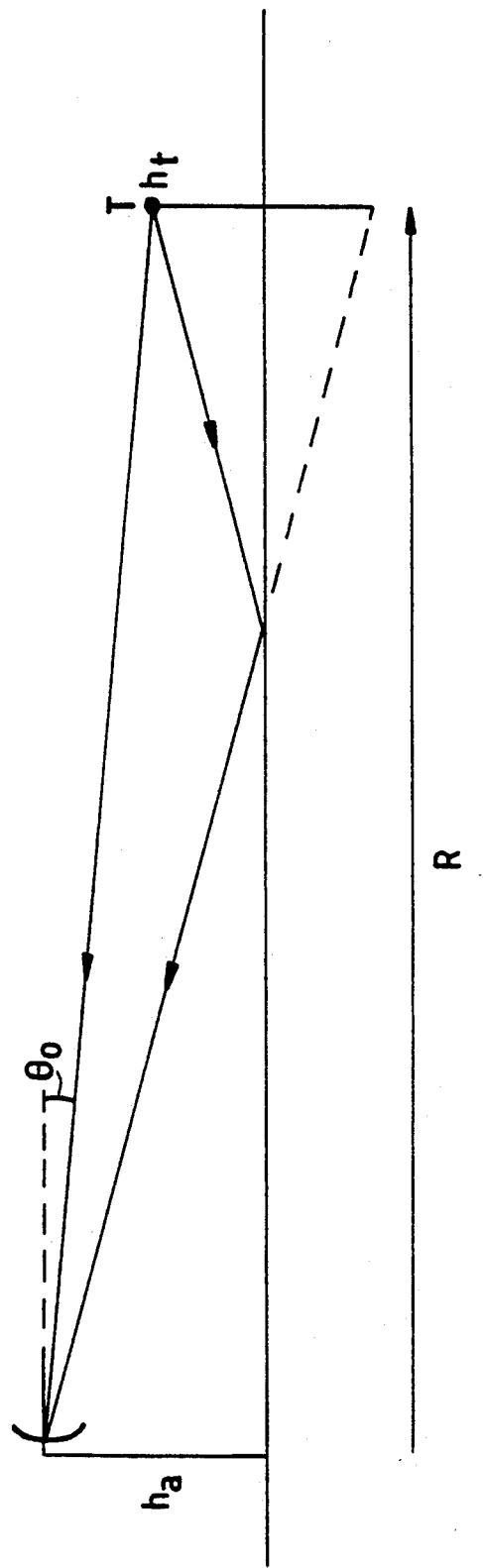
FIG. 3 illustrates the multipath effect.

In the event of a single target in the beam, an echo of which is received directly and as a mirror image via the sea surface, as represented in FIG. 3, S proves to assume a complex value. In FIG. 3 $h_a$ represents the height of the antenna above the sea surface, $h_t$ represents the height of the target above the sea surface, R represents the range from target to radar antenna and $\theta_o$ represents the antenna elevation angle. For a moving target, S becomes a function of the target range R, the target height $h_t$, the radar transmitter wavelength $\lambda$ and of several system constants. Our objective is to find an equation which incorporates these values and from which $h_t$ can be derived. This equation will then constitute the basis for the claimed method and apparatus.

For forming this equation we define:

$h_a$ height of the antenna above the sea surface.
$h_t$ height of the target above the sea surface.
R range from target to radar antenna.
$\theta_o$ antenna elevation angle.
$\theta_t$ elevation error angle of the target.
$\theta_m$ elevation error angle of the mirror image.
$\rho$ reflection coefficient of the sea surface.
$\Psi$ perturbation phase for the reflection on the sea surface.
$\phi$ phase difference between the reflections of target and mirror image.
$G_\Sigma(\theta)$ antenna diagram of the elevation sum channel.
$G_\Delta(\theta)$ antenna diagram of the elevation difference channel.
$E(\theta)$ elevation error voltage curve.

The following approximations can now be derived:

$$\theta_t = \frac{h_t - h_a}{R} - \theta_o \tag{1}$$

$$\theta_m = \frac{-h_t - h_a}{R} - \theta_o \tag{2}$$

$$\phi = \frac{4\pi h_t h_a}{\lambda R} + \psi \tag{3}$$

Furthermore the following applies:

$$E(\theta) = \frac{G_\Delta(\theta)}{G_\Sigma(\theta)} \tag{4}$$

$$\Sigma = G_\Sigma(\theta_t) - \rho G_\Sigma(\theta_m) \cdot e^{j\phi} \tag{5}$$

$$\Delta = G_\Delta(\theta_t) - \rho G_\Delta(\theta_m) \cdot e^{j\phi} \tag{6}$$

$$S = \frac{\Delta}{\Sigma} = \frac{G_\Delta(\theta_t) - \rho G_\Delta(\theta_m) \cdot e^{j\phi}}{G_\Sigma(\theta_t) - \rho G_\Sigma(\theta_m) \cdot e^{j\phi}} \tag{7}$$

Subsequently we can define:

$$A = E(\theta_t) = E\left(\frac{h_t - h_a}{R} - \theta_o\right) \tag{8}$$

$$B = -E(\theta_m) = -E\left(\frac{-h_t - h_a}{R} - \theta_o\right) = \tag{9}$$

$$E\left(\frac{h_t + h_a}{R} + \theta_o\right)$$

The last equation is based on the odd symmetry of $E(\theta)$.

We define a corrected reflection coefficient G, thereby considering that in case of a monopulse antenna directed at the target, the reflection of the mirror image is additionally attenuated by the antenna diagram:

$$G = \rho \frac{G_\Sigma\left(\frac{-h_t - h_a}{R} - \theta_o\right)}{G_\Sigma\left(\frac{h_t - h_a}{R} - \theta_o\right)} \quad (10)$$

Subsequently it follows from (3), (7), (8), (9) and (10) that:

$$S = A + \frac{e^{j\phi}}{1 - Ge^{j\phi}} \cdot G \cdot (A + B) \quad (11)$$

During normal target tracking, the antenna is directed at the target, consequently $A=0$:

$$S = \frac{e^{j\phi}}{1 - Re^{j\phi}} \cdot G \cdot B \quad (12)$$

The real part of S can be defined as follows:

$$Re(S) = \frac{\cos\phi - G}{1 + G^2 - 2G\cos\phi} \cdot G \cdot B \quad (13)$$

For the argument of S, the following applies:

$$arg(S) = \phi + \arctg\left(\frac{G\sin\phi}{1 - G\cos\phi}\right) \quad (14)$$

hence:

$$\frac{d}{dt}arg(S) = \left(1 + \frac{\cos\phi - G}{1 + G^2 - 2G\cos\phi}\right)\frac{d}{dt}\phi \quad (15)$$

A combination of (13) and (15) yields the desired equation:

$$\frac{d}{dt}arg(S) = \left(1 + \frac{Re(S)}{B}\right)\frac{d}{dt}\phi \quad (16)$$

A closer examination reveals that $h_t$ and $\Psi$ are the only unknowns in (16) in addition to several system parameters and measuring values.

For a smooth sea surface we may assume that:

$$\frac{d}{dt}\psi = 0 \quad (17)$$

Together with (16) this yields:

$$\frac{d}{dt}arg(S) = \quad (18)$$

$$\frac{4\pi h_a h_t}{\lambda} \cdot \left(1 + \frac{Re(S)}{E\left(\frac{h_a + h_t}{R} - \theta_o\right)}\right) \cdot \frac{d}{dt}\left(\frac{1}{R}\right)$$

Assuming that $E(\theta)$ is linear for small values of $\theta$, this is a quadratic equation in $h_t$. If $E(\theta)$ is not linear, the equation can be solved, for example following the Newton method. From a series of target height estimates, thus obtained in time, the best target height estimate is derived by a conventional filtering process with a time constant and a provision for eliminating extremely deviating estimates, a method well known in the art.

A second solution shall be selected, if the smooth sea surface condition does not apply, consequently if $$\frac{d}{dt}\psi \neq 0.$$

We can then eliminate the unknown $\Psi$ by measuring at two different wavelengths. The following can be derived from (16):

$$arg(S_2) - arg(S_1) = \int_{\phi_1}^{\phi_2}\left(1 + \frac{Re(S)}{B}\right)d\phi \quad (19)$$

For minor wavelength differences the following approximation can be used:

$$\frac{1}{\phi_2 - \phi_1}\int_{\phi_1}^{\phi_2} Re(S)\,d\phi = \frac{Re(S_1) + Re(S_2)}{2} \quad (20)$$

With (3), (9) and (19) this yields:

$$arg(S_2) - arg(S_1) = \quad (21)$$

$$\frac{4\pi h_a h_t}{R}\left(\frac{1}{\lambda_2} - \frac{1}{\lambda_1}\right)\left(1 + \frac{Re(S_1) + Re(S_2)}{2E\left(\frac{h_a + h_t}{R} - \theta_o\right)}\right)$$

This equation can be solved by means of one of the methods described under (18).

The values of $h_t$ thus obtained can be used for directing the transmitting antenna and the receiving antenna at the target. In this way an elevation error angle is realized which may show an improvement by an order of magnitude as compared against a monopulse radar apparatus where the imaginary part of the elevation error voltage is ignored. In addition, this method is comparatively insusceptible to perturbations, particularly $A=0$ proves to be a non-stringent condition.

I claim:

1. A method for determining the height of a low-elevation target using a radar apparatus provided with an antenna means connected to a transmitting and receiving unit and including a signal processing unit connected to said transmitting and receiving unit, said method comprising the steps of:

illuminating a target by electromagnetic radiation emitted from said transmitting unit and said antenna means directed at the target to provide a transmitted signal;

receiving by means of said antenna means said transmitted signals directly reflected from said target and indirectly reflected from said target by way of said earth surface in the direction of said antenna means;

deriving, by means of said receiving unit, complex sum signals $\Sigma$ and complex elevation difference signals $\Delta$;

determining, on the basis of an algorithm carried out by the signal processing unit, the height of the target from the complex sum and elevation difference signals wherein the target range R and the complex elevation error voltage $S = \Delta/\Sigma$ are derived from the complex signals $\Sigma$ and $\Delta$ with the height $h_t$ of the target being determined by:

$$\frac{d}{dt} arg(S) = f(R, h_t, Re(S)).$$

2. The method as claimed in claim 1, whereby, for the antenna means, and the receiving unit, a real error voltage curve $E(\theta)$ is known for a target with an elevation error angle $\theta$, the transmitted signal has a wavelength $\lambda$, the antenna means is positioned at a height $h_a$ above the earth surface and makes an elevation angle $\theta_o$ with the earth surface, and the method includes the step of solving:

$$\frac{d}{dt} arg(S) = \frac{4\pi h_a h_t}{\lambda} \cdot \left(1 + \frac{Re(S)}{E\left(\frac{h_a + h_t}{R} - \theta_o\right)}\right) \cdot \frac{d}{dt}\left(\frac{1}{R}\right).$$

3. The method as claimed in claim 1, whereby for the antenna means, and the receiving unit, a real elevation error curve $E(\theta)$ is known for a target with an elevation angle $\theta$, the transmitting antenna successively transmits at least signals of wavelengths $\lambda_1$ and $\lambda_2$, in which $\lambda_1 \neq \lambda_2$, the antenna means is positioned at a height $h_a$ above the earth surface and makes an elevation angle $\theta_o$ with the earth surface and whereby the values $$\Sigma_1, \Delta_1, S_1 = \Delta_1/\Sigma_1, \Sigma_2, \Delta_2 \text{ and } S_2 = \Delta_2/\Sigma_2,$$

are determined, and the method includes determining $h_t$ by solving the equation $$Arg(S_2) - Arg(S_1) =$$

$$\frac{4\pi h_a h_t}{R} \left(\frac{1}{\lambda_2} - \frac{1}{\lambda_1}\right) \left(1 + \frac{Re(S_1) + Re(S_2)}{2E\left(\frac{h_a + h_t}{R} - \theta_o\right)}\right).$$

4. An apparatus for determining the height of a low-elevation target, comprising:

a radar including a transmitting unit and a receiving unit each being connected to an antenna means substantially directed towards said target wherein electromagnetic radiation emitted by said transmitting unit and said antenna means illuminates a target and whereby said antenna means receives a reflected signal including the transmitted signal directly reflected by said target and the transmitted signal reflected by said target via the surface of the earth;

said receiving unit including a means for generating complex sum signals $\Sigma$ at least complex elevation difference signals $\Delta$ and a target Range signal R; and signal processor means connected to said receiving unit and provided with an algorithm for determining the height of the target $h_t$ from the following equation:

$$\frac{d}{dt} arg(S) = f(R, h_t, Re(S))$$

where S is the complex elevation-error voltage and $S = \Delta/\Sigma$.

5. The apparatus as claimed in claim 4, whereby for the antenna means, and the receiving unit, a real error voltage curve $E(\theta)$ is known for a target with an elevation error angle $\theta$, the transmitted signal has a wavelength $\lambda$, the antenna means is positioned at a height $h_a$ above the earth surface and makes an elevation angle $\theta_o$ with the earth surface, where the signal processor means comprises means programmed for solving the target height from the following equation:

$$\frac{d}{dt} arg(S) = \frac{4\pi h_a h_t}{\lambda} \cdot \left(1 + \frac{Re(S)}{E\left(\frac{h_a + h_t}{R} - \theta_o\right)}\right) \cdot \frac{d}{dt}\left(\frac{1}{R}\right)$$

6. The apparatus as claimed in claim 4, whereby for the antenna means, and the receiving unit, a real error voltage curve $E(\theta)$ is known for a target with an elevation angle $\theta$, the antenna means being provided with means for successively generating transmitter signals of wavelengths $\lambda_1$ and $\lambda_2$ in which $\lambda_1 \neq \lambda_2$ and whereby the values $$\Sigma_1, \Delta_1, S_1 = \Delta_1/\Sigma_1, \Sigma_2, \Delta_2 \text{ and } S_2 = \Delta_2/\Sigma_2,$$

are determined, the antenna means is positioned at a height $h_a$ above the earth surface and makes an elevation angle $\theta_o$ with the earth surface, where the signal processor means comprises means programmed for solving the target height $h_t$ from the following equation:

$$Arg(S_2) - Arg(S_1) =$$

$$\frac{4\pi h_a h_t}{R} \left(\frac{1}{\lambda_2} - \frac{1}{\lambda_1}\right) \left(1 + \frac{Re(S_1) + Re(S_2)}{2E\left(\frac{h_a + h_t}{R} - \theta_o\right)}\right).$$

* * * * *

UNITED STATES PATENT AND TRADEMARK OFFICE
CERTIFICATE OF CORRECTION

PATENT NO. : 5,278,564
DATED : JANUARY 11, 1994
INVENTOR(S) : ALBERT GROENENBOOM

It is certified that error appears in the above-indentified patent and that said Letters Patent is hereby corrected as shown below:

Page 65, column 7, between lines 50 and 55, before "(" (second occurrence), insert --)--;

column 8, between lines 55 and 60, before "(" (second occurrence), insert --)--

Signed and Sealed this

Second Day of August, 1994

Attest:

BRUCE LEHMAN

*Attesting Officer*   *Commissioner of Patents and Trademarks*